(12) United States Patent
Lewonig

(10) Patent No.: US 9,786,157 B2
(45) Date of Patent: Oct. 10, 2017

(54) BUS SYSTEM AND METHOD FOR OPERATING SUCH A BUS SYSTEM

(71) Applicant: AMRONA AG, Zug (CH)

(72) Inventor: Horst Lewonig, Hannover (DE)

(73) Assignee: AMRONA AG, Zug (CH)

( * ) Notice: Subject to any disclaimer, the term of this patent is extended or adjusted under 35 U.S.C. 154(b) by 0 days.

(21) Appl. No.: 15/028,994

(22) PCT Filed: Sep. 30, 2014

(86) PCT No.: PCT/EP2014/070854
§ 371 (c)(1),
(2) Date: Apr. 13, 2016

(87) PCT Pub. No.: WO2015/058928
PCT Pub. Date: Apr. 30, 2015

(65) Prior Publication Data
US 2016/0275783 A1        Sep. 22, 2016

(30) Foreign Application Priority Data

Oct. 25, 2013   (EP) ..................................... 13190211

(51) Int. Cl.
*G08B 29/06*        (2006.01)
*G08B 25/04*        (2006.01)
(Continued)

(52) U.S. Cl.
CPC ............. *G08B 29/06* (2013.01); *G08B 25/04* (2013.01); *H04L 12/403* (2013.01);
(Continued)

(58) Field of Classification Search
CPC ...... G08B 29/06; G08B 25/04; G08B 25/003; H04L 12/40032; H04L 12/403; H04L 12/423; H04L 12/437
(Continued)

(56) References Cited

U.S. PATENT DOCUMENTS 6,091,705 A * 7/2000 Regula ................... G01R 31/08
                                                           370/223
7,668,994 B2 * 2/2010 Albrecht ............... H04J 3/0641
                                                           710/110

(Continued)

FOREIGN PATENT DOCUMENTS

EP        1363261 A1    11/2003
EP        1978687 A2    10/2008
(Continued)

*Primary Examiner* — Hirdepal Singh
(74) *Attorney, Agent, or Firm* — Shumaker, Loop & Kendrick, LLP; James D. Miller

(57) ABSTRACT

The invention relates to a bus system (1) comprising a control unit (2) and at least one bus node (3.1, 3.2, 3.3). The control unit (2) is allocated at least two data communication interfaces (2.1, 2.2) which are respectively designed to transmit and receive data. The at least one bus node (3.1, 3.2, 3.3) comprises a bus coupler having at least two data communication interfaces (3.11, 3.12; 3.21, 3.22; 3.31, 3.32) respectively designed to transmit and receive data. The control unit (2) and the at least one bus node (3.1, 3.2, 3.3) are respectively connected together via their data communication interfaces and corresponding two-point connections (8) to form a ring topology. The bus coupler of the at least one bus node is designed to directly and without delay transmit, and thus forward, data received at one of its at least two communication interfaces via its other data communication interface.

14 Claims, 12 Drawing Sheets

(51) Int. Cl.
  *H04L 12/40* (2006.01)
  *H04L 12/423* (2006.01)
  *H04L 12/437* (2006.01)
  *H04L 12/403* (2006.01)
  *G08B 25/00* (2006.01)
(52) U.S. Cl.
  CPC ...... *H04L 12/40032* (2013.01); *H04L 12/423* (2013.01); *H04L 12/437* (2013.01); *G08B 25/003* (2013.01)
(58) Field of Classification Search
  USPC ........................................................ 340/502
  See application file for complete search history.

(56) References Cited

U.S. PATENT DOCUMENTS

| 8,299,911 | B2* | 10/2012 | Buss | ...................... | G08B 25/04 |
| | | | | | 340/507 |
| 2004/0008720 | A1* | 1/2004 | Wang | ..................... | H04L 12/422 |
| | | | | | 370/460 |
| 2008/0131122 | A1* | 6/2008 | Reisslein | ............ | H04J 14/0227 |
| | | | | | 398/59 |
| 2010/0011144 | A1* | 1/2010 | Ristau | ................. | H04L 41/0677 |
| | | | | | 710/305 |
| 2010/0214909 | A1* | 8/2010 | Ceccarelli | ............. | H04L 12/437 |
| | | | | | 370/228 |
| 2011/0029687 | A1* | 2/2011 | Kirrmann | .............. | H04L 12/437 |
| | | | | | 709/236 |
| 2015/0124807 | A1* | 5/2015 | Martin | ................ | H04L 12/2838 |
| | | | | | 370/390 |

FOREIGN PATENT DOCUMENTS

| EP | 2023543 A1 | 2/2009 |
| EP | 2282452 A1 | 2/2011 |
| WO | 91/17609 A1 | 11/1991 |

* cited by examiner

BUS SYSTEM AND METHOD FOR OPERATING SUCH A BUS SYSTEM

CROSS-REFERENCE TO RELATED APPLICATIONS

This application is a United States national phase application based on PCT/EP2014/070854 filed Sep. 30, 2014, which claims the benefit of European Patent Application No. EP 13190211.6 filed Oct. 25, 2013. The entire disclosure of the above applications are hereby incorporated herein by reference.

FIELD OF THE INVENTION

The present invention relates to a bus system, particularly for monitoring and/or controlling components of a fire alarm, firefighting and/or oxygen-reducing system. The invention further relates to a method for operating such a bus system.

BACKGROUND

The task of a fire alarm system is that of detecting a fire as early as possible and triggering signals and notifications so that suitable measures can be initiated. It is thereby essential for the fire alarm system to function reliably in order to ensure that appropriate signaling can occur in timely manner in the event of fire.

It is frequently the case that a fire alarm system is not only designed to signal a fire hazard but also to detect same and even undertake suitable measures as applicable. A fire alarm system inasmuch usually consists of a number of interlinked components such as automatic fire alarms, manual fire alarms, acoustic or optical signaling devices or extinguishing system components. These components are connected to a central fire alarm control panel via one or more transmission path(s).

To that end, using a ring bus system to link the components of a fire alarm system to a central fire alarm control panel and/or control unit is known in the field of fire prevention. The advantage of a ring bus system can be seen in all the connected bus nodes continuing to remain responsive to the control unit even in the event of a short or open circuit.

Reference is made in this context to printed publication EP 1 363 261 A1 which discloses a ring bus system of a hazard alarm system.

However, the ring bus systems known from the prior art in the fire prevention field exhibit disadvantages in practical use resulting from the limited bandwidth of the bus systems. The limited bandwidth leads to typical query times of all the components connected to the ring bus system, such as for e.g. status polling (alarm/malfunction status), amounting to several seconds. Typical restart times for the ring bus system after a line failure are in the range of one to five minutes.

Although these response times are entirely sufficient for operation of a fire alarm system according to the EN 54-13 standard (August 2005), the response times are not suitable for detecting analog values of sensors connected to the bus system, for example gas sensors of an oxygen-reducing system, at sufficient resolution or sampling. Nor do the response times of the known prior art ring bus systems meet the time-based requirements of an electrical control and delay device (ECD) for fire extinguishing systems as per e.g. EN 12094-1 or VdS 2496.

SUMMARY

Taking these problems as a basis, the present invention is based on the task of further developing a bus system as described above and known from the prior art to the effect of being able to improve the bus system response time while at the same time ensuring the continuing accessibility of all the bus nodes, even in the event of an open circuit. A corresponding method for operating such a bus system is moreover to be specified.

With respect to the bus system, this task is solved by the subject matter of independent claim 1 and, with respect to the method, by the subject matter of independent claim 8. Advantageous embodiments of the inventive solution are indicated in the dependent claims.

Accordingly, proposed in particular is a bus system comprising a control unit (also known as a loop controller) as well as at least one and preferably a plurality of peripheral devices which are connected into the bus system as bus nodes. These peripheral devices (bus nodes) are in particular components of a fire alarm system and particularly include fire alarms, alarm devices (e.g. according to an EN 54-series standard), valves for activating a fire-extinguishing system and sensor feedback components of extinguishing system components (e.g. according to an EN 12094-series standard), but also for example sensors, particularly gas sensors of an oxygen-reducing system such as e.g. oxygen sensors.

The control unit of the bus system according to the invention, which is preferably connected to a central fire alarm control panel, comprises at least two independently realized data communication interfaces (hereinafter also referred to as "ports"), whereby each of these at least two data communication interfaces are respectively designed to transmit and receive data.

Each peripheral device (bus node) comprises a so-called bus coupler, by means of which the peripheral device (bus node) is connected to the bus system. To this end, each bus coupler has at least two independently realized data communication interfaces (ports), each of which being likewise designed—as with the data communication interfaces of the control unit—to transmit and receive.

In the inventive bus system, the control unit and the bus coupler of the individual peripheral devices connected to the bus system are connected together via their respective data communication interfaces and corresponding two-point connections to form a ring topology. The individual two-point connections constitute independent bus segments, at least parts of which can be designed as wired and/or optical data transmission channels.

The term "ring topology" as used herein refers to a networking or connecting structure in which two nodes are in each case connected to one another in a two-point connection so as to form a closed ring. The data (information) to be transmitted for example from the control unit is relayed from node to node in the ring topology until reaching its point of destination. Each bus node can thereby concurrently work as a so-called "repeater," hence enabling the bridging of large distances.

The inventive solution in particular provides for each bus coupler of each individual bus node (peripheral device) to be configured so as to directly and without delay transmit, and thus forward, data sent from the control unit and received at one of its at least two data communication interfaces via the other of its at least two data communication interfaces. In other words, each bus node forwards received data to the other bus nodes without any delay.

The inventive solution in particular provides for the bus coupler of each bus node (peripheral device) to be configured so as to generally—particularly in response to bus node-addressed data or commands previously received from the control unit—transmit data to the control unit via its at least two data communication interfaces and in opposite ring topology directions. In other words, when the control unit of the bus system transmits data to a specific bus node, particularly data having an acknowledge/response request, the return or response signal of this bus node is sent in both directions of the ring topology to the control unit.

The advantages which the inventive solution is able to achieve can particularly be seen in its improving—compared to the known prior art solutions—the bus system's achievable response times both during operation as well as when re-starting the system. It is at the same time ensured that the control unit will still be able to communicate with all the bus nodes even in the event of an open circuit.

To this end, one aspect of the present invention provides for the bus coupler of an individual bus node to comprise a transmit/receive switching unit designed to preferably automatically detect the start of data being received at least at one of the at least two data communication interfaces of the bus coupler and preferably automatically connect a receive line of the respective data communication interface to a transmit line of the other data communication interface upon detecting the start of data reception at one of the at least two data communication interfaces of the bus coupler.

Doing so ensures delay-free data forwarding and rapid-response communication between the control unit and the peripheral devices.

One preferential realization of the latter cited development of the inventive bus system provides for the transmit/receive switching unit to preferably comprise a logic module and/or a microcontroller.

According to a further aspect of the invention, the previously cited transmit/receive switching unit of the bus coupler, or control unit respectively, is designed to preferably automatically detect the end of data reception at least at the one of the at least two data communication interfaces and disconnect the receive line connection of the respective data communication interface to the transmit line of the respective other data communication interface upon detecting the end of data reception.

To not only be able to ensure delay-free data forwarding but also direct communication with a bus node of the bus system, a further aspect of the present invention provides for the at least one bus node to comprise a processing unit external of the bus coupler which is formed by a logic module and/or microcontroller. The transmit/receive switching unit of the bus coupler is further designed so as to preferably automatically connect the receive line of a data communication interface to a receive line of the processing unit upon the start of data reception being detected at said one of the at least two data communication interfaces of the bus coupler.

To enable the inventive bus system to realize the data communication as described at the outset, the processing unit of the bus coupler is designed in a further development of the above embodiments so as to control the transmit/receive switching unit of the bus coupler such that the transmit line of the processing unit connects to the transmit line of a first and/or second data communication interface of the bus coupler.

According to a further aspect of the invention, the processing unit of the bus node is designed to control the transmit/receive switching unit of the bus coupler so as to inhibit the automatic connection of the receive line of one of the at least two data communication interfaces of the bus coupler to the transmit line of another of the at least two data communication interfaces of the bus coupler.

According to one preferential realization of the inventive bus system, the control unit of the bus system transmits data, in particular bus node-addressed data or commands, to the respective bus node particularly via only one of the at least two data communication interfaces. Each bus node on the other hand generally transmits data to the control unit via its at least two data communication interfaces, and does so in opposite directions of the ring topology. The bus node thereby sends the data to the control unit particularly in response to data or commands previously received from the control unit and addressed accordingly.

One aspect of the present invention provides for the control unit of the bus system to first identify the respective bus nodes connected to the bus system for the purpose of automatic initialization and then assign the identified bus nodes a specific address, particularly a bus ID.

A substantial advantage able to be achieved with the solution according to the invention is particularly to be seen in the system being able to automatically detect a malfunction, particularly a break, in a two-point connection (bus segment) of the ring topology. This for example occurs when a bus node transmits data via the bus system to the control unit and only one of the control unit's at least two data communication interfaces receives said data.

Alternatively or additionally hereto, the system can deduce a malfunction of a bus node when the control unit transmits data along with an acknowledge/response request to a bus node over only one of the at least two data communication interfaces and the control unit receives no data from the intended bus node via at least one of its at least two data communication interfaces despite the acknowledge/response request.

Initialization of the bus system is for example effected upon the initial startup of the system or upon a replacing or supplementing of the peripheral devices connected to the bus system. This initializing is preferably automatic, and namely by the control unit sending configuration data to the first bus node over one of its at least two data communication interfaces. The configuration data can for example be a relevant data packet. By receiving the configuration data, the first bus node is assigned a unique address (bus ID).

After the first bus node is assigned a unique address, the control unit transmits a second configuration dataset, likewise over the one of its at least two data communication interfaces. The first bus node ignores this second configuration dataset because the configuration dataset is not addressed to it. Instead, the first bus node forwards the configuration dataset directly to the next bus node (while maintaining the transmission direction). In other words, when the bus node receives a configuration dataset not addressed to it at one of its two ports, it forwards it to the next bus node via its other port. In this manner, each bus node is sequentially assigned a bus ID.

The control unit detects the end of the initialization process upon the control unit's other data communication interface (port) subsequently receiving the data again as was initially sent by the control unit. This will then occur when each bus node is assigned a unique bus ID.

According to one aspect of the invention, the control unit can directly address individual bus nodes, and does so by using the bus ID of the respective bus node. It is thereby provided for a bus node to send a respective response to a command, or an acknowledge/response request of the control unit respectively, via both ports (data communication interfaces). This means that both of the control unit's ports receives the bus node's response.

Both ports of a respective bus node always respond to an acknowledge/response request addressed to that specific bus node. After initialization, the bus node directly forwards all data to the next bus node while maintaining the transmission direction. This occurs without delay, in particular without pre-verifying the address.

The communication between control unit and bus node can in particular be communication based on the master/slave principle. In this case, the control unit serves as the master unit and the individual bus nodes as the slave units. The bus nodes then only transmit data upon receiving a corresponding bus node-addressed command from the control unit. The respective bus node thereupon sends a response to the control unit.

Alternatively, it is conceivable for the bus nodes and control unit to communicate with each other per peer-to-peer communication. In this case, the bus nodes can transmit data to the control unit without there needing to be a corresponding bus node-addressed request from the control unit. Peer-to-peer communication is for example advantageous when one or more bus nodes are realized as manually operated fire alarms. When such a bus node is manually actuated, it can send corresponding data to the control unit in an automatic response as part of the peer-to-peer communication.

So as to create a redundant system and further minimize potential sources of malfunctions, a further aspect of the invention provides for an auxiliary control unit connected in parallel to the control unit. Upon failure of the (main) control unit, the auxiliary control unit takes over the prior function of the failed unit.

BRIEF DESCRIPTION OF THE DRAWINGS

The following will reference the drawings in describing example embodiments of the invention in greater detail.

Shown are.

DETAILED DESCRIPTION

Figure 1:
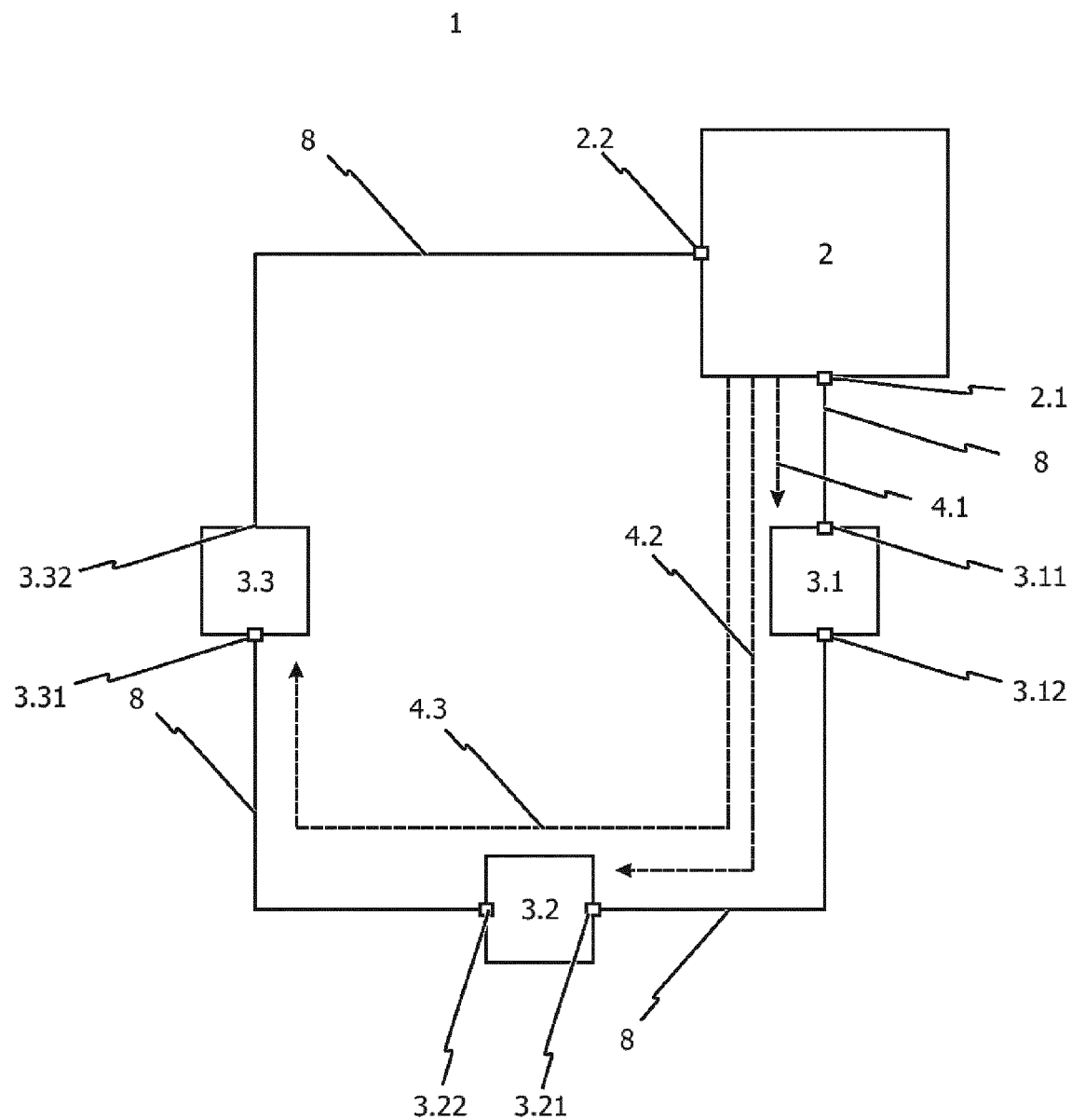
FIG. 1 a schematic representation illustrating an initialization process in an embodiment of the bus system according to the invention.

The example embodiments of the inventive bus system 1 depicted schematically in the drawings are particularly suitable for monitoring and/or controlling components of a fire alarm, firefighting and/or oxygen-reducing system. These components are in each case integrated into the bus system 1 as bus nodes 3.1, 3.2, 3.3 and can communicate with a control unit 2 implemented as a loop controller associated with said bus system 1.

Each bus node 3.1, 3.2, 3.3 has a bus coupler 11 via which the respective bus node 3.1, 3.2, 3.3 is coupled to the bus line of the bus system 1. Each bus coupler 11 has at least two (exactly two in the depicted embodiments) data communication interfaces 3.11, 3.12; 3.21, 3.22; 3.31, 3.32 respectively designed to transmit and receive data. The control unit 2 designed as a loop controller is also provided with two data communication interfaces 2.1, 2.2 which are likewise each designed to transmit and receive data.

It is hereby to be noted that the representations provided in FIGS. 1 to 4 only show data communication interfaces 3.11, 3.12; 3.21, 3.22; 3.31, 3.32 of the bus coupler 11. A schematic block diagram of an example bus node 3.1, 3.2, 3.3 with bus coupler 11, via which the bus node 3.1, 3.2, 3.3 is coupled to the bus line of the bus system 1, is shown in FIG. 5. The mode of operation of the bus coupler 11 is apparent from the representations provided in FIGS. 6 to 12.

The individual components of the bus system 1; i.e. the control unit 2 and the respective bus node 3.1, 3.2, 3.3, are connected to one another via individual bus segments, whereby each bus segment forms a two-point connection 8 between two adjacent components (control unit and bus node) of the bus system 1. A ring topology is thereby formed such that bus system 1 is a ring bus system.

The bus segments forming the two-point connections 8 can be at least in part formed as wired and/or optical data transmission channels, particularly fiber optic connections comprising optical fibers.

In particular provided with the inventive bus system 1 is for each bus node 3.1, 3.2, 3.3 of the bus system 1 to preferably transmit data received from the control unit 2 at one of its two data communication interfaces 3.11, 3.12; 3.21, 3.22; 3.31, 3.32 without delay via its other data communication interface 3.11, 3.12; 3.21, 3.22; 3.31, 3.32. Data to be conveyed from the control unit is thus forwarded from bus node to bus node. As will be described in greater detail below, this forwarding occurs without pre-verifying addresses so as to avoid any delay.

The inventive bus system 1 in particular provides for each bus node 3.1, 3.2, 3.3 of the bus system 1 to transmit identical information (data) over both its first as well as its second communication interface 3.11, 3.12; 3.21, 3.22; 3.31, 3.32 when said node needs or intends to send data to the control unit 2 so that the data is sent to the control unit 2 over two different data transmission channels running in opposite directions within the ring topology.

When the data transmission realized in the bus system 1 is based on the master/slave principle, the respective bus node 3.1, 3.2, 3.3 transmits the data in response to a prior prompt received from the control unit 2. Data transmission based on the peer-to-peer principle is however also conceivable—in this case, data can also be transmitted by the bus node 3.1, 3.2, 3.3 to the control unit 2 without a corresponding request being made by the control unit 2.

In the example embodiments of the inventive bus system 1 schematically depicted in the drawings, the control unit 2 generally only sends all data to the bus node(s) 3.1, 3.2, 3.3 over one of its two data communication interfaces 2.1, 2.2 in "normal" bus operation; i.e. before a malfunction is detected in a two-point connection 8 of the ring topology. If, however, a malfunction is detected in a two-point connection 8 of the ring topology, the control unit 2 changes its transmission mode and then sends the identical information (data) to the given bus node(s) 3.1, 3.2, 3.3 over both of its data communication interfaces 2.1, 2.2. The identical information is then sent over two separate data transmission channels in opposite transmission directions relative to the ring topology. How the system can automatically detect a malfunction in a two-point connection 8 of the ring topology will be described in greater detail below with reference to the schematic representation in FIG. 3.

FIG. 1 schematically depicts a first example embodiment of the inventive bus systems 1. Three bus nodes 3.1, 3.2, 3.3 are schematically depicted in the bus system 1 according to FIG. 1. It is however noted that there can be any arbitrary number of bus nodes, in particular also considerably more than only three bus nodes can be integrated into the bus system 1. The inventive bus system 1 would also be suitable—at least in principle—for only one single bus node.

Depending on the respective application, wired data transmission can also be of advantage. In such a case, wired two-point connections 8 would be provided as bus segments. These could thereby in particular be 2-core or 4-core cables, preferably accordingly shielded against electromagnetic interference. A respective twisted-pair cable or other similar types of cable in which the wires are twisted together in pairs are for example well-suited to the bus segments. Doing so takes advantage of the knowledge that pairs of wire of varying degrees of twisting (length of lay) and different rotational directions within one cable can be stranded, whereby twisted pairs of wires offer better protection against external alternating magnetic fields and electrostatic interference than wires run only in parallel.

Before the bus system 1 can be put into operation, it first needs to be initialized. This is necessary upon the initial startup of the system, as well as also upon a relaunch, for instance upon a change in the configuration of the bus nodes integrated into the bus system 1, for example after additional bus nodes have been added to the bus system.

Before the bus system 1 is initialized, e.g. upon a restart of the system or upon initial startup, all of the bus nodes 3.1, 3.2, 3.3 are in a neutral state, also called the "idle state" herein. As the broken arrows in FIG. 1 indicate, to initialize the system, the control unit 2 only transmits corresponding configuration data 4.1 to the "first" bus node 3.1 directly adjacent the control unit 2 in the ring topology over its (first) data transmission interface 2.1 for the purpose of assigning it a relevant address (bus ID).

The control unit 2 thereafter transmits further configuration data 4.2, likewise via its (first) data transmission interface 2.1. Since a unique address was already assigned to the first bus node 3.1 and the further configuration data 4.2 is not addressed to the address associated with the first bus node 3.1, the first bus node 3.1 ignores this further configuration data 4.2. "Ignore" in this context means that the first bus node 3.1 recognizes that the further configuration data 4.2 is not addressed to it. As a result, this further configuration data 4.2 is forwarded directly to the next bus node 3.2, and done so while maintaining the transmission direction in the ring topology (clockwise in FIG. 1). Since this second bus node 3.2 is still in its idle state to this point, the bus node 3.2 is likewise assigned a unique address by means of the further configuration data 4.2.

This initialization process is continued until each bus node 3.1, 3.2, 3.3 has been assigned a unique address.

Completion of the initialization process is recognized once the control unit 2 receives a configuration dataset back again, namely via its second data communication interface 2.2, which said control unit 2 previously transmitted over its first data communication interface 2.1.

Figure 2:
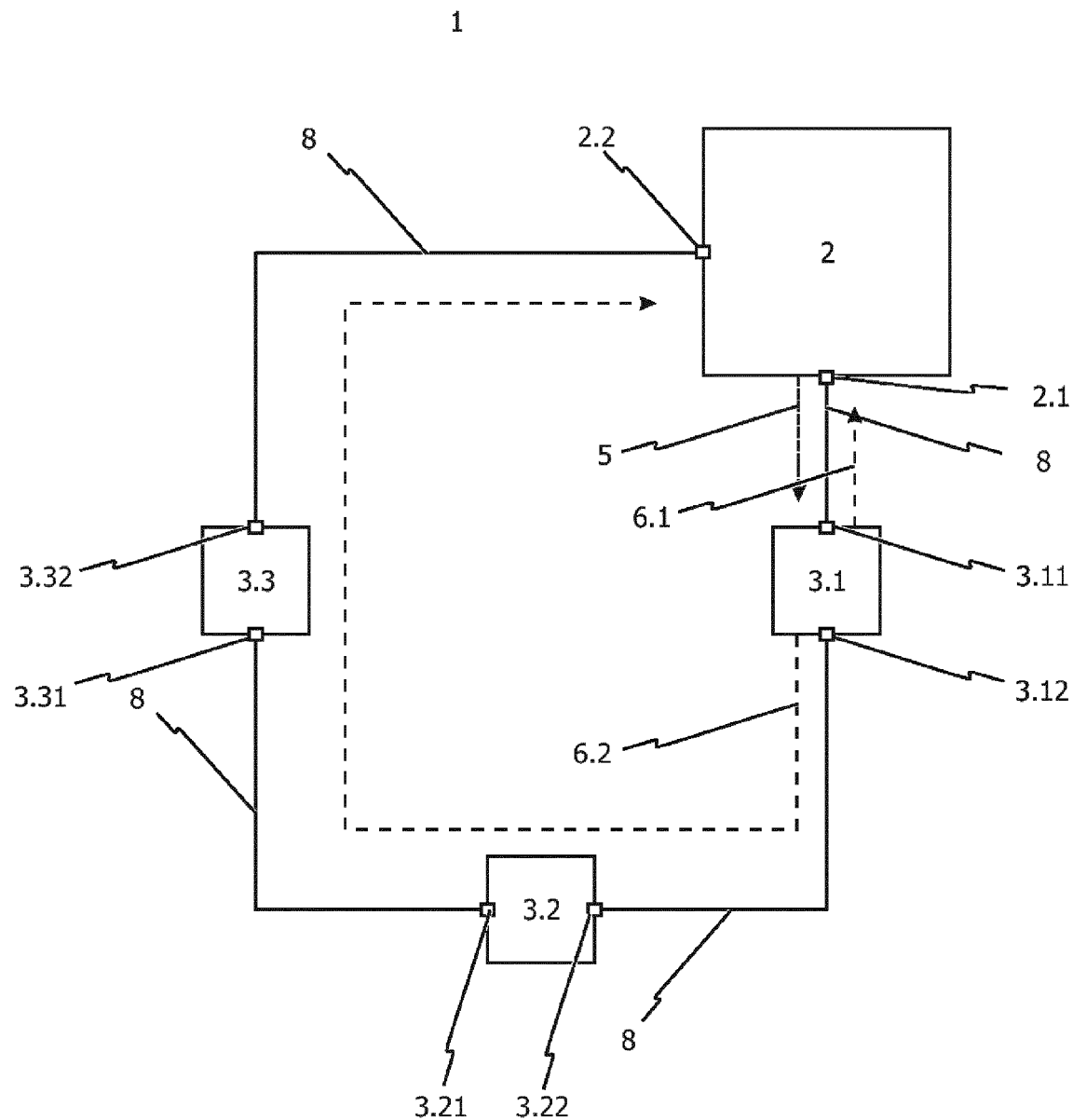
FIG. 2 a schematic representation illustrating the mode of operation of an intact bus system according to the invention after its initialization.

FIG. 2 shows a schematic representation of the bus system 1 according to FIG. 1 subsequent its initialization. According thereto, the control unit 2 can now directly address individual bus nodes, such as e.g. the "first" bus node 3.1, in particular by means of a bus node-addressed command 5, while still being able to receive corresponding responses from individual bus nodes.

An example data transmission procedure is depicted in FIG. 2 by means of the figure's broken arrows. Specifically, the control unit 2 sends a command 5 to the first bus node 3.1 in the state depicted schematically in FIG. 2. This command 5 is received at a port 3.11 of the respective bus node 3.1. The bus node 3.1 thereupon sends a corresponding response back to the control unit 2.

In detail, this ensues by identical information (data) being in each case sent back to the control unit 2 over the two data transmission interfaces 3.11, 3.12 of the bus node 3.1, and this occurring in opposite—with respect to the ring topology—transmission directions. This is indicated schematically in FIG. 2 by means of broken arrows 6.1, 6.2.

The responses (data) sent via transmission paths 6.1 and 6.2 thus reach both ports 2.1 and 2.2 of the control unit 2 since they run through the bus system in opposite directions. The control unit 2 can thus recognize that the bus system 1 is functioning properly since the control unit 2 determines that the data 6.1, 6.2 of bus node 3.1 reached both of its ports 2.1 and 2.2.

Figure 3:
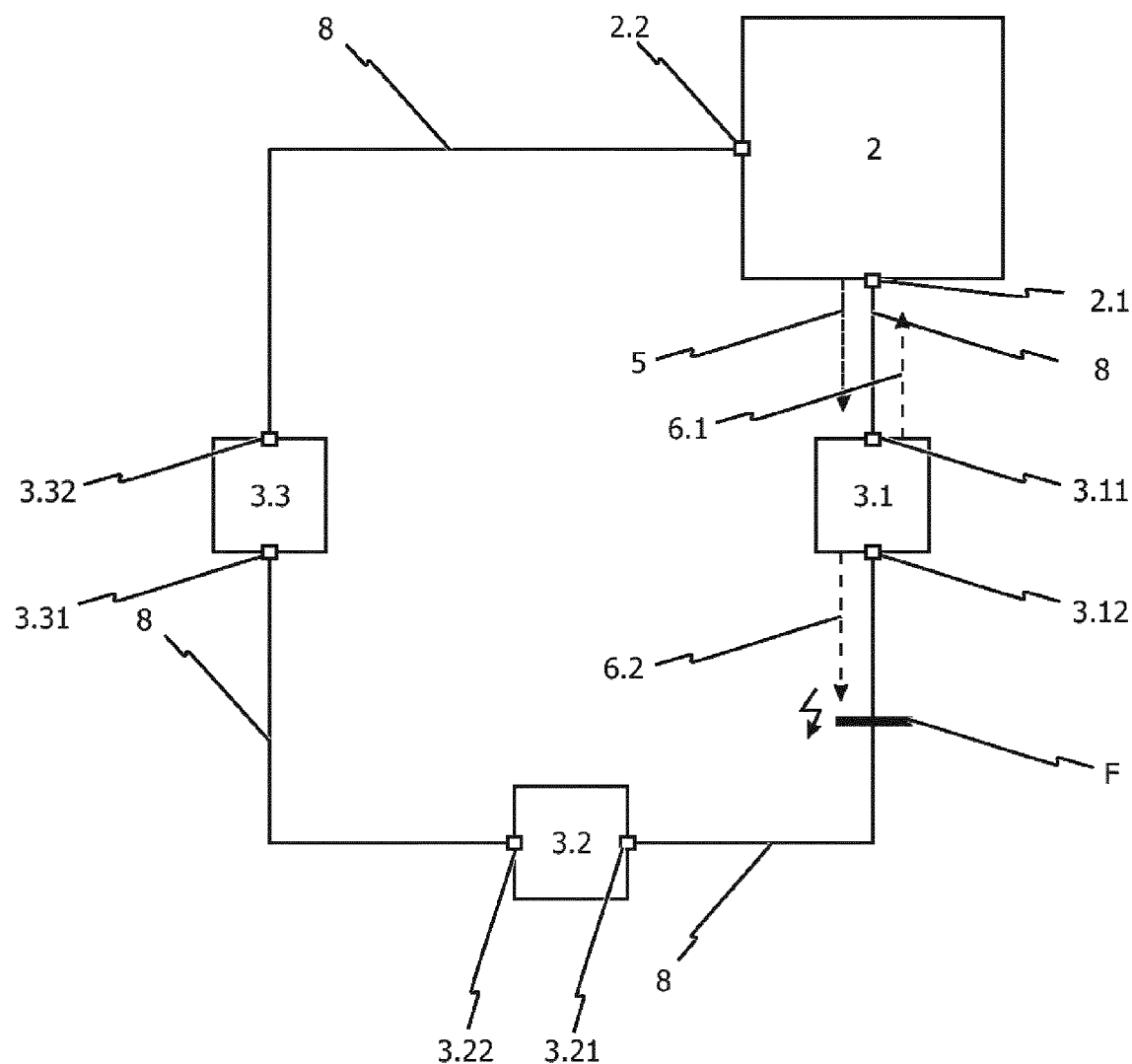
FIG. 3 a schematic representation illustrating line error detection by the control unit in a bus system according to the present invention.

FIG. 3 shows an example situation in which a line failure F has occurred in a bus segment 8 of the bus system 1. The following will refer to the schematic depiction of FIG. 3 in describing how the inventive bus system 1 detects a data transmission malfunction in a bus segment 8 of the bus system 1.

As FIG. 3 indicates, a first dataset 5 of the control unit 2 reaches the first bus node 3.1 unhindered since in the example situation depicted in FIG. 3, the line failure F is downstream—relative to the control unit's selected transmission direction within the ring topology—of the first bus node 3.1. The bus node 3.1 sends corresponding responses 6.1 and 6.2 back to the control unit 2. Because of the line failure F, the message 6.2 cannot reach the control unit 2. Only response 6.1 of the bus node 3.1 reaches the control unit 2 at port 2.1. Since the control unit 2 does not receive responses of bus node 3.1 at both ports 2.1, 2.2, the existence of a line failure is in this case concluded.

Figure 4:
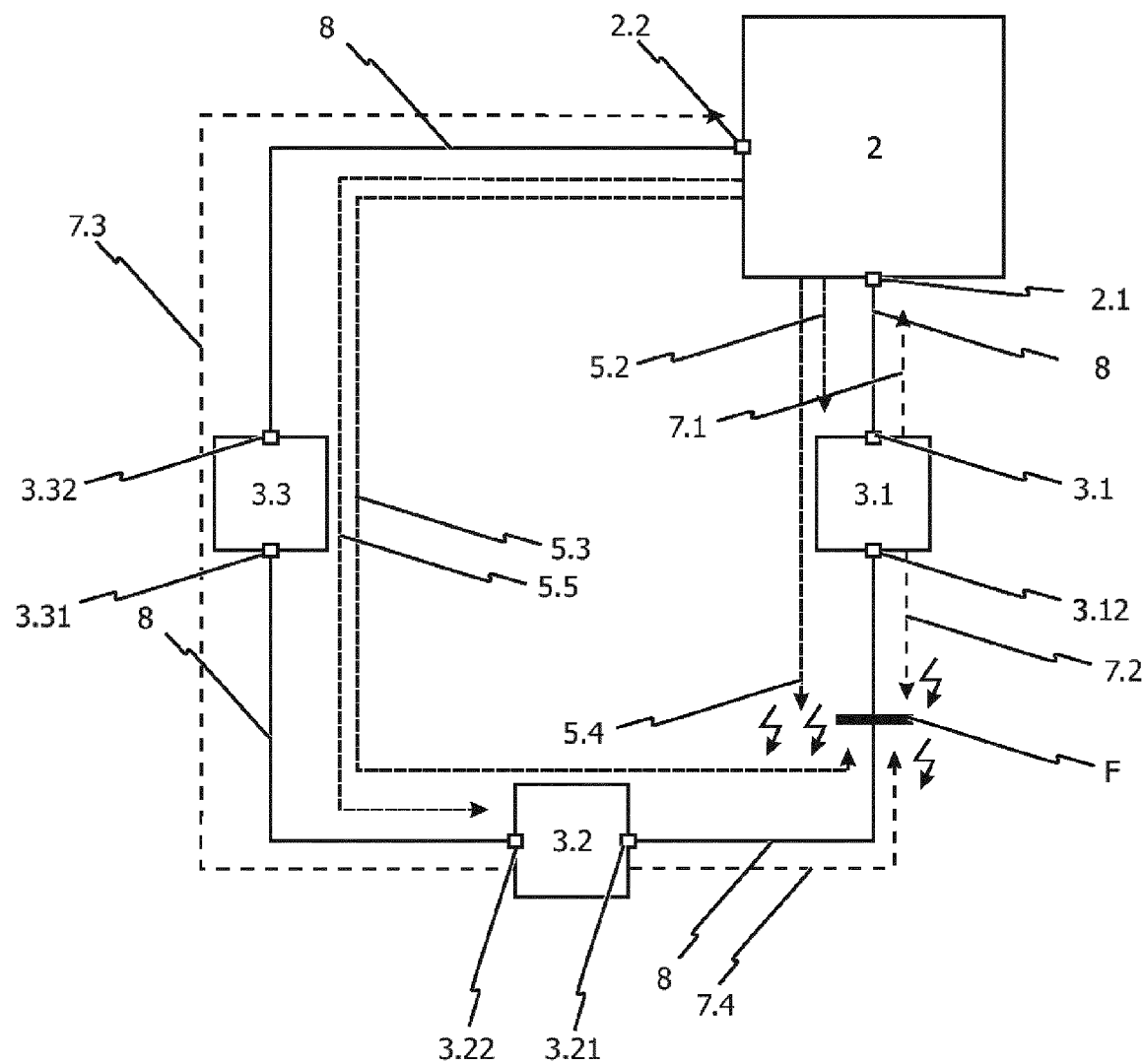
FIG. 4 a schematic representation illustrating the procedure after detection of a malfunction or line error in the bus system according to FIG. 3.
Figure 5:
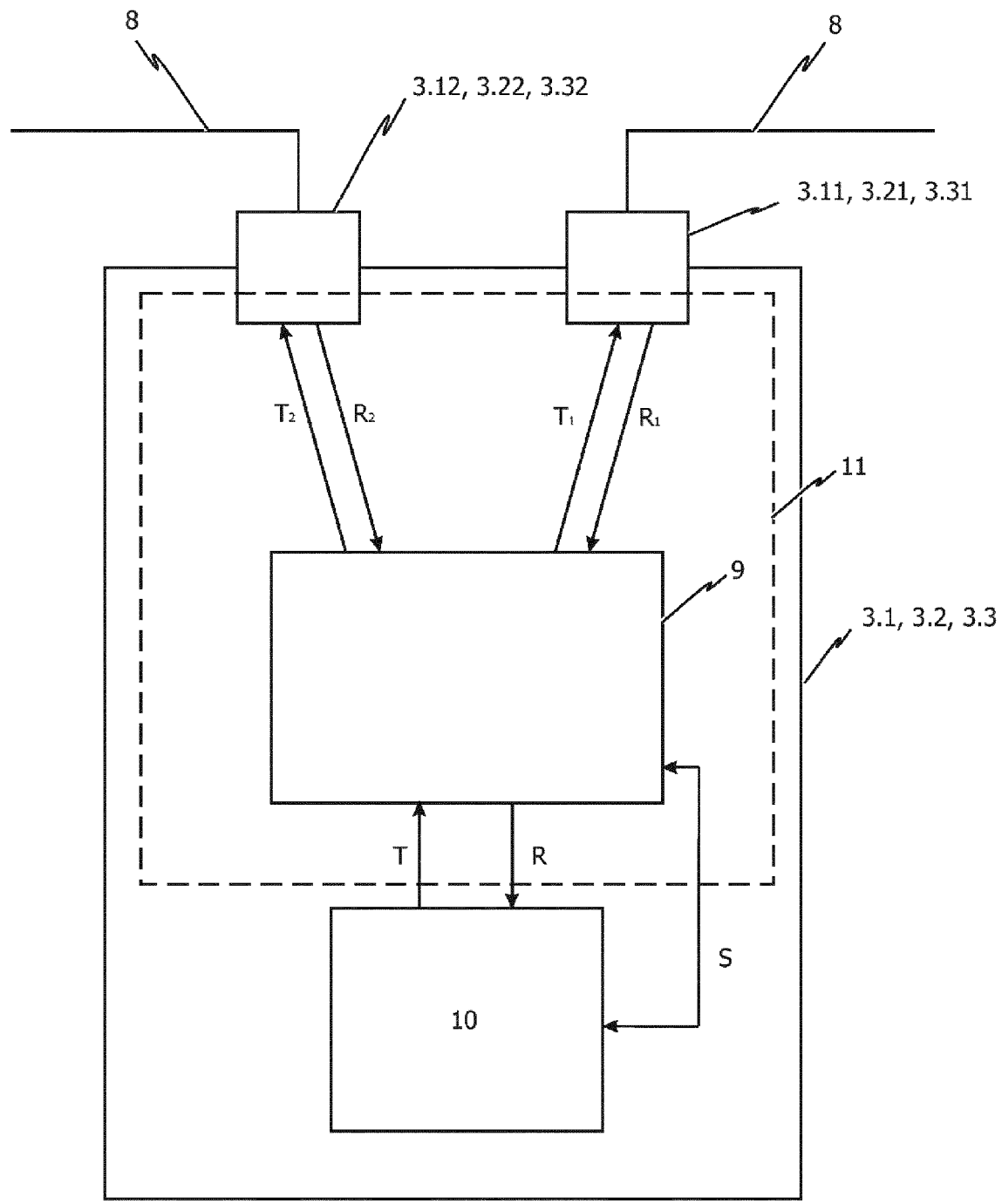
FIG. 5 a schematic block diagram of an example bus node coupled to the bus line of the bus system.
Figure 6:
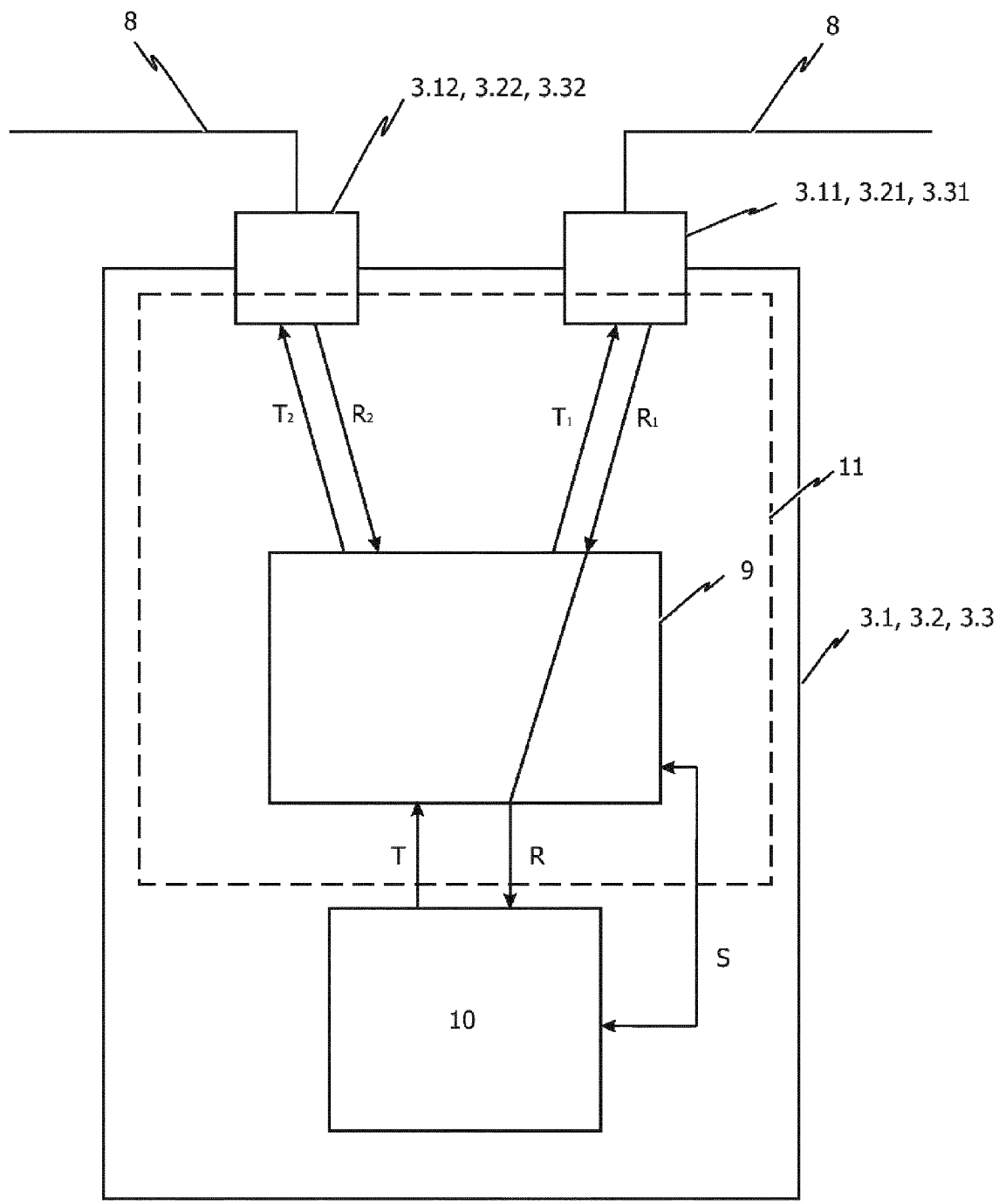
FIG. 6 a schematic block diagram of the example bus node according to FIG. 5 in a state in which the bus node receives data over the first data communication interface of the bus coupler.
Figure 7:
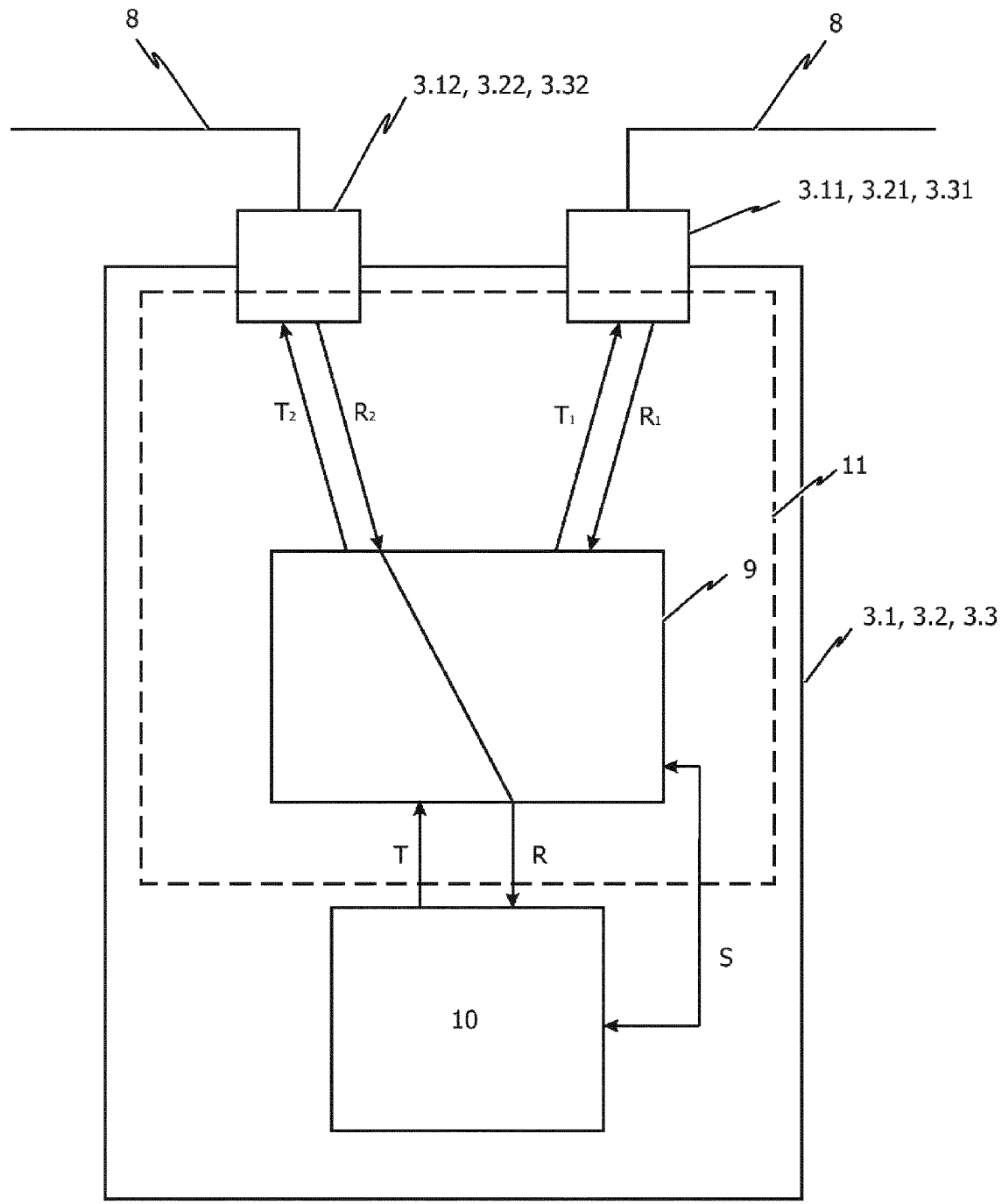
FIG. 7 a schematic block diagram of the example bus node according to FIG. 5 in a state in which the bus node receives data over the second data communication interface of the bus coupler.

FIG. 4 schematically depicts the procedure subsequent detection of a malfunction or a line failure F in the bus system 1 according to FIG. 3. Directly after a line failure F having been detected, the control unit 2 transmits all data to the bus nodes 3.1, 3.2, 3.3 over both of its ports 2.1, 2.2. FIG. 4 depicts an example of how different bus nodes 3.1, 3.2 on different sides of the line failure F receive commands from the control unit 2.

In the case of a bus node, for example the first bus node 3.1, being on the upstream side of the line failure F in the clockwise direction of the ring topology, the command identified by reference numeral "5.2" reaches the bus node 3.1 whereas the command identified by reference numeral "5.3" does not reach the first bus node 3.1 since it is blocked by the line failure F. The first bus node 3.1 nevertheless sends its responses 7.1 and 7.2 over both its ports 3.11 and 3.12. In this case, only one response (response 7.1) thus reaches the control unit 2, and that being at port 2.1. The transmission of the other response 7.2 is blocked by the line failure F.

In the case of the second bus node 3.2, positioned on the downstream side of the line failure F in the clockwise direction of the ring topology, a dataset/command of the control unit 2 identified by reference numeral "5.5" in FIG. 4 reaches the second bus node 3.2 via the second port 2.2 of the control unit 2. The dataset/command of the control unit 2 identified by reference numeral "5.4", transmitted by the control unit 2 via its first port 2.1, does not reach the second bus node 3.2 due to the line failure F. In turn, the second bus node 3.2 then sends commands 7.3 and 7.4 to the control unit 2 via its two ports 3.21 and 3.22. In this case, the dataset/command identified by reference numeral "7.3" reaches the control unit via second port 2.2 and the dataset/command identified by reference numeral "7.4" does not reach the control unit 2 due to the line failure F.

This procedure can be easily generalized for as many bus nodes as desired and it is directly evidently that the control unit 2 can communicate with all the bus nodes via bus system 1, or via the method of operating bus systems 1 respectively, even given a line failure F. In addition, it is not necessary to restart or reinitialize any individual or all of the bus nodes. The delay which occurs upon incidence of a line failure F is thus limited to the period it takes to detect the line failure F. Immediately after the line failure F has been detected, the control unit 2 transmits commands from both of its ports 2.1 and 2.2, and can thus communicate with all of the bus nodes.

Because the bus nodes in turn send responses to control unit 2 commands via both of its ports, this can thus ensure that all control unit 2 commands can be received at all times by all of the bus nodes when there is a line failure F as well as the control unit 2 being able to receive all the responses of the bus nodes.

The following will reference the depictions provided in FIGS. 5 to 12 in describing the structure and mode of operation of a bus coupler 11 as used in an example embodiment of the inventive bus system 1 to couple a bus node 3.1, 3.2, 3.3 to the bus line of the bus system 1.

According to the schematic block diagram shown in FIG. 5, the example embodi-ment of the bus coupler 11 comprises a transmit/receive switching unit 9. The bus coupler 11 furthermore encompasses the at least two data communication interfaces 3.11, 3.12; 3.21, 3.22; 3.31, 3.32 of the respective bus nodes 3.1, 3.2, 3.3. As previously noted, each bus node 3.1, 3.2, 3.3 has exactly two data communication interfaces 3.11, 3.12; 3.21, 3.22; 3.31, 3.32 in the embodiments shown in the drawings such that the following will refer to the first and second data communication interface of the bus coupler 11.

As the respective arrows T1, T2, R1 and R2 of FIG. 5 indicate, the transmit/receive switching unit 9 of the bus coupler is in bi-directional communication with the two data communication interfaces 3.11, 3.12; 3.21, 3.22; 3.31, 3.32 associated with the bus coupler 11. It is specifically provided for data to be able to be sent from the transmit/receive switching unit 9 to the first data communication interface 3.11, 3.21, 3.31 via transmit line T1 while data can be sent from the transmit/receive switching unit 9 to the second data communication interface 3.12, 3.22, 3.32 via transmit line T2. The receive lines R1 and R2 thereby serve in ensuring that data received via the first and/or second data communication interface 3.11, 3.12; 3.21, 3.22; 3.31, 3.32 of the bus coupler reaches the transmit/receive switching unit 9.

It is hereby to be considered that the FIG. 5 representation is only a schematic depiction. In particular, the arrows T1, T2, R1 and R2 therein primarily depict only data flow and the data flow direction. It is thus particularly conceivable for the transmit line T1 and the receive line R1, or transmit line T2 and receive line R2 respectively, to be physically identical.

The bus coupler 11 further has an interface T, R, S, via which the transmit/receive switching unit 9 is connected to a microcontroller 10 of the bus node 3.1, 3.2, 3.3. The microcontroller 10, which is sometimes also called an "application controller," represents the functionality of the peripheral device implemented as bus node 3.1, 3.2, 3.3. Among the functions of the application controller is that of reading sensor data and/or controlling actuators. In the example embodiments depicted in the drawings, the microcontroller 10 is not a component of the bus coupler 11.

According to one preferential realization of the bus coupling indicated schemati-cally in FIG. 5, the data communication interface between the transmit/receive switching unit 9 and the microcontroller 10 has on the one hand a bi-directional serial data connection, by means of which the data stream of the ring bus is routed from the transmit/receive switching unit 9 to the microcontroller 10, and a plurality of control lines S for controlling the behavior of the transmit/receive switching unit 9 in the bus coupler 11. The data communication between the transmit/receive switching unit 9 and the microcontroller 10 is depicted schematically in FIG. 5 by means of the "R" and "T" arrows. The "R" arrow is hereby to symbolize a received—from the perspective of the peripheral device—data stream (receive line), and the "T" arrow is to symbolize an outbound—from the perspective of the peripheral device—data stream (transmit line) to the bus system 1.

Depending on the control effected by the application controller (microcontroller 10), the bus coupler either routes the data to the ring bus in that the data is directly exchanged between the two data communication interfaces 3.11, 3.12; 3.21, 3.22; 3.31, 3.32 of the bus coupler or it blocks the data from being so routed. When data is conveyed by the bus coupler, this is referred to as the ring being closed. The ring is otherwise open. In either case, however, data at one of the two data communication interfaces 3.11, 3.12; 3.21, 3.22; 3.31, 3.32 of the bus coupler is output to the data communication interface between the transmit/receive switching unit 9 and the microcontroller 10.

Data can additionally be transmitted from the data communication interface between the transmit/receive switching unit 9 and the microcontroller 10 to the first and/or second data communication interface 3.11, 3.12; 3.21, 3.22; 3.31, 3.32 of the bus coupler.

Figure 11:
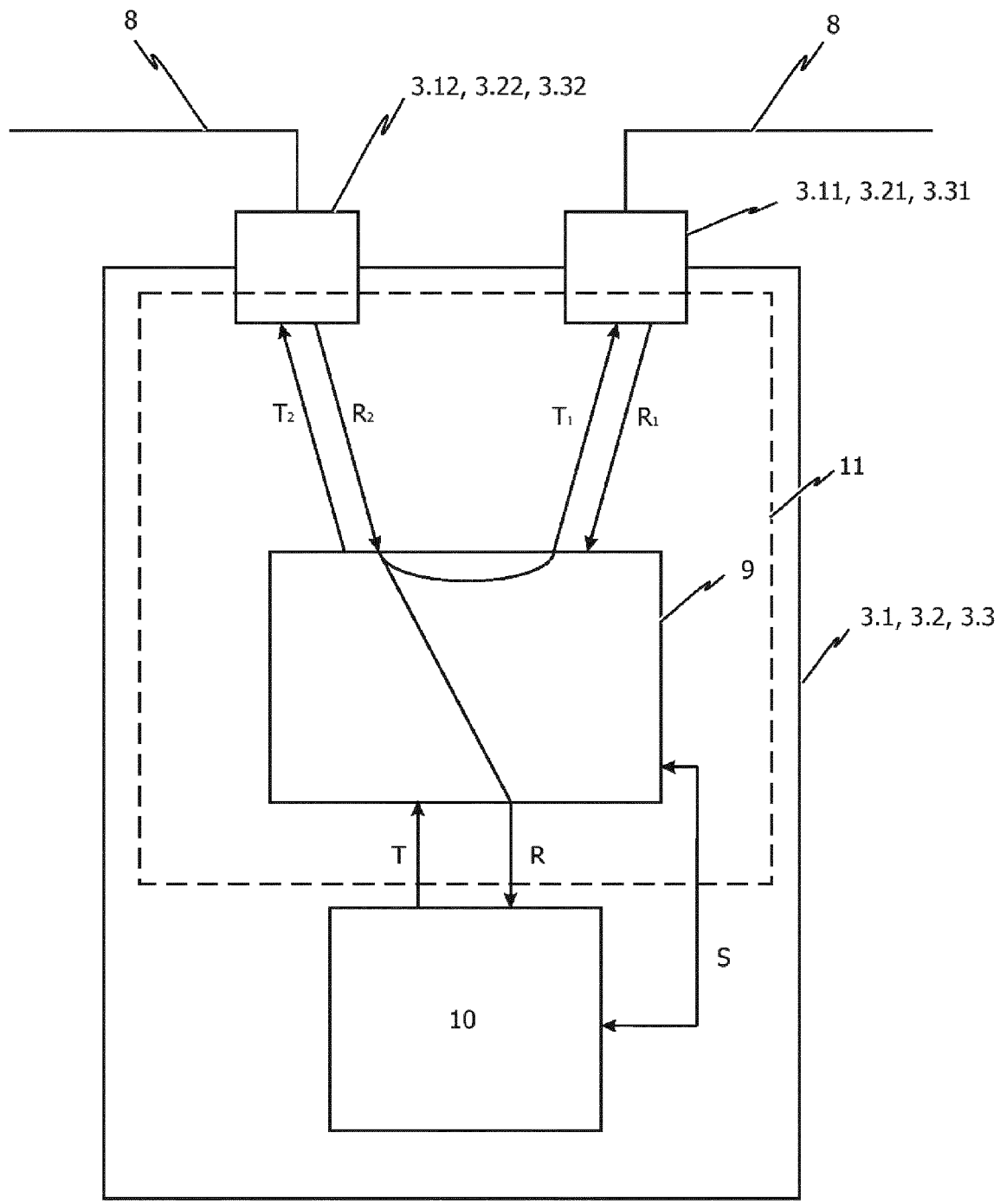
FIG. 11 a schematic block diagram of the example bus node according to FIG. 5 in a state in which the bus coupler transmit/receive switching unit ring is closed and data received at the second data communication interface of the bus coupler is forwarded to the first data communication interface of the bus coupler.
Figure 12:
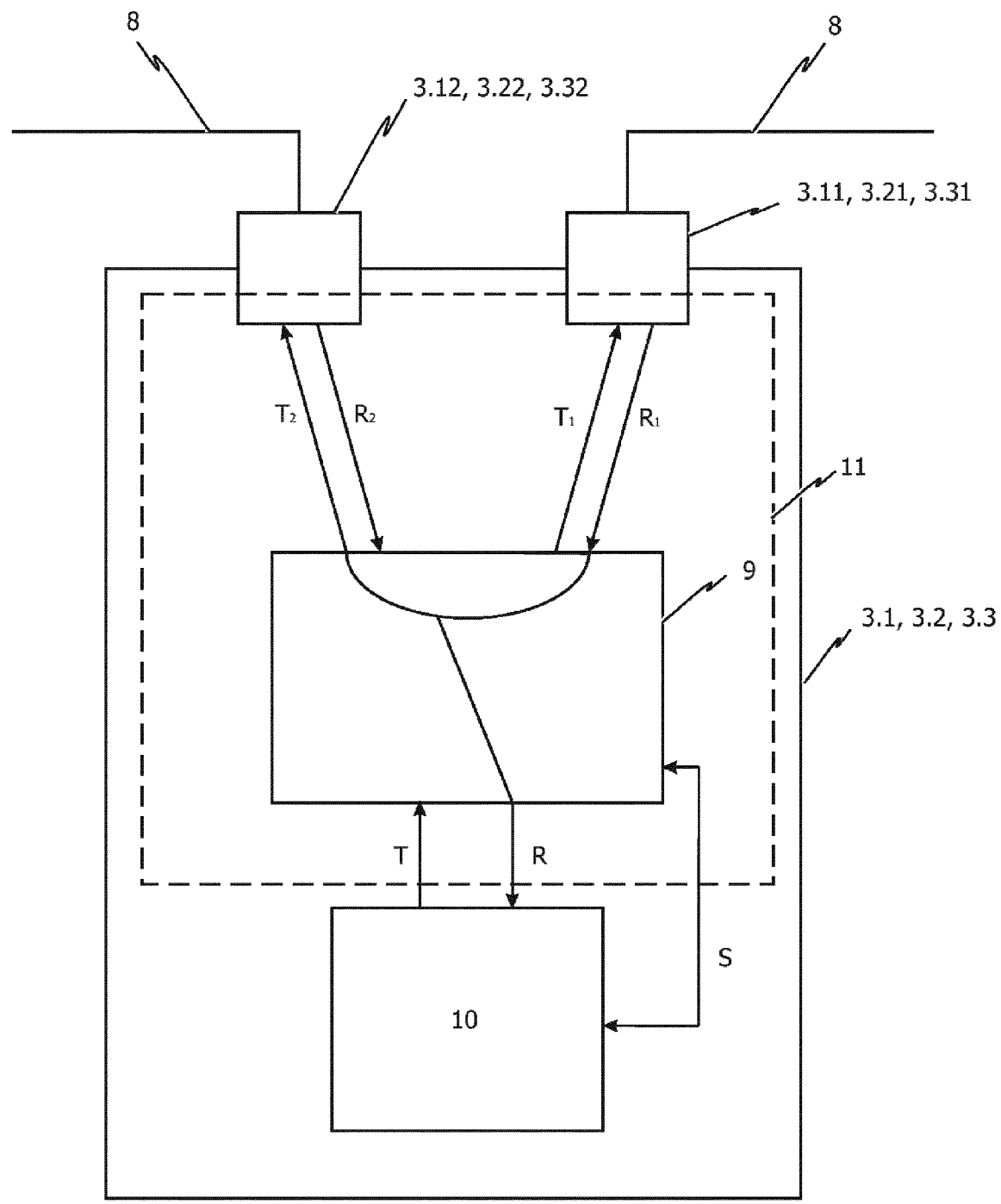
FIG. 12 a schematic block diagram of the example bus node according to FIG. 5 in a state in which the bus coupler transmit/receive switching unit ring is closed and data received at the first data communication interface of the bus coupler is forwarded to the second data communication interface of the bus coupler.

As will be described in greater detail below with reference to the representations provided in FIGS. 6 to 12, the transmit/receive switching unit 9 of the bus coupler 11 depicted schematically in FIG. 5 is designed to detect the start of data reception at least at one of the two data communication interfaces 3.11, 3.12; 3.21, 3.22; 3.31, 3.32 of the bus coupler and, upon detecting the start of data reception at one of the two data communication interfaces 3.11, 3.12; 3.21, 3.22; 3.31, 3.32, automatically connect the receive line R1, R2 of the respective data communication interface 3.11, 3.12; 121, 3.22; 3.31, 3.32 to a transmit line T1, T2 of the other data communication interface 3.11, 3.12; 3.21, 3.22; 3.31, 3.32 (see FIGS. 11 and 12). By so doing, data can be routed through the bus coupler 11 without any delay.

The transmit/receive switching unit 9 of the bus coupler 11 depicted schematically in FIG. 5 is furthermore designed to automatically connect the receive line R1, R2 of the data communication interface 3.11, 3.12; 3.21, 3.22; 3.31, 3.32 to the receive line R of the microcontroller 10 upon detecting the start of data being received at one of the two data communication interfaces 3.11, 3.12; 3.21, 3.22; 3.31, 3.32 of the bus coupler (see FIGS. 6, 7, 11 and 12).

Figure 8:
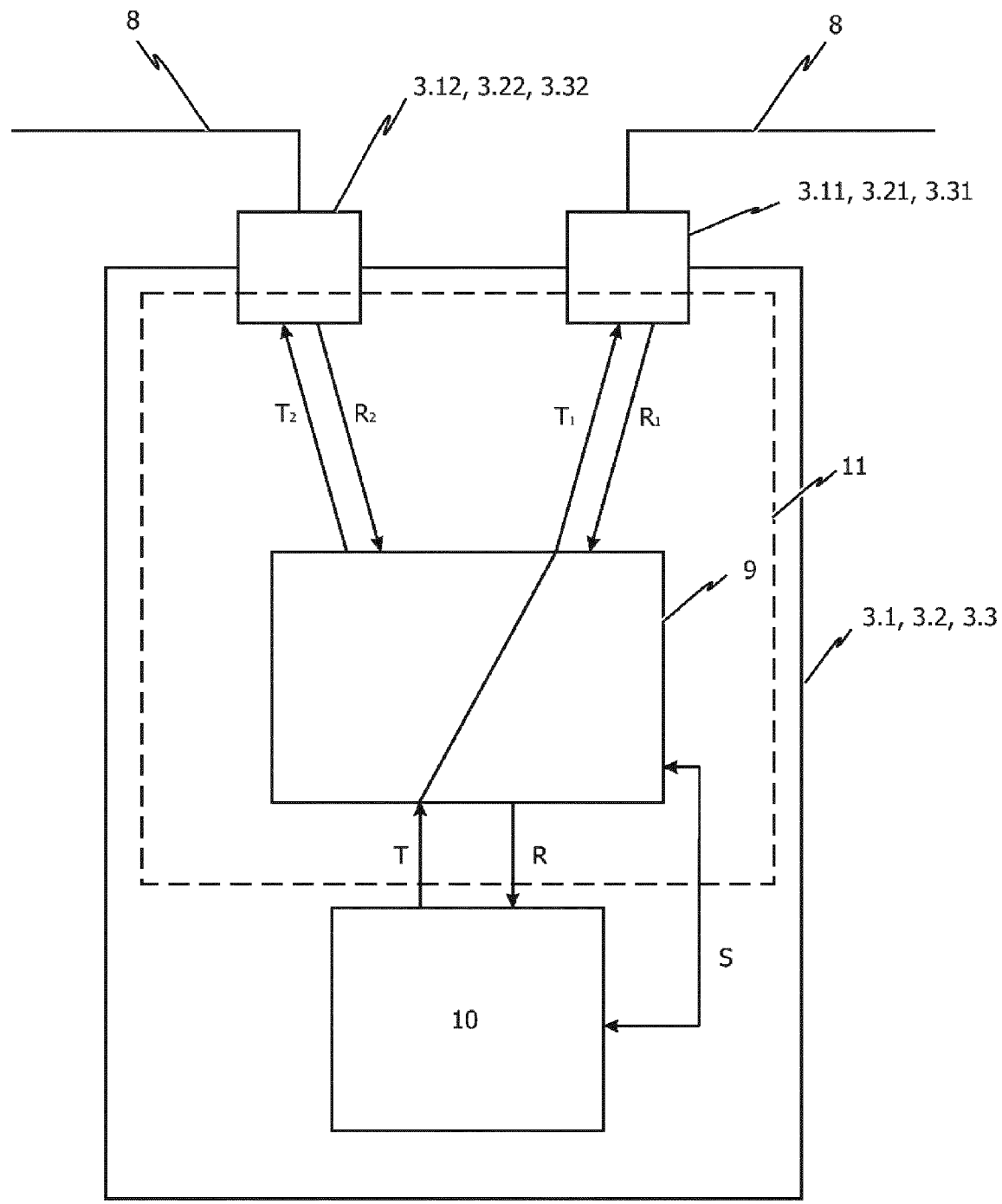
FIG. 8 a schematic block diagram of the example bus node according to FIG. 5 in a state in which the bus node transmits data over the first data communication interface of the bus coupler.
Figure 9:
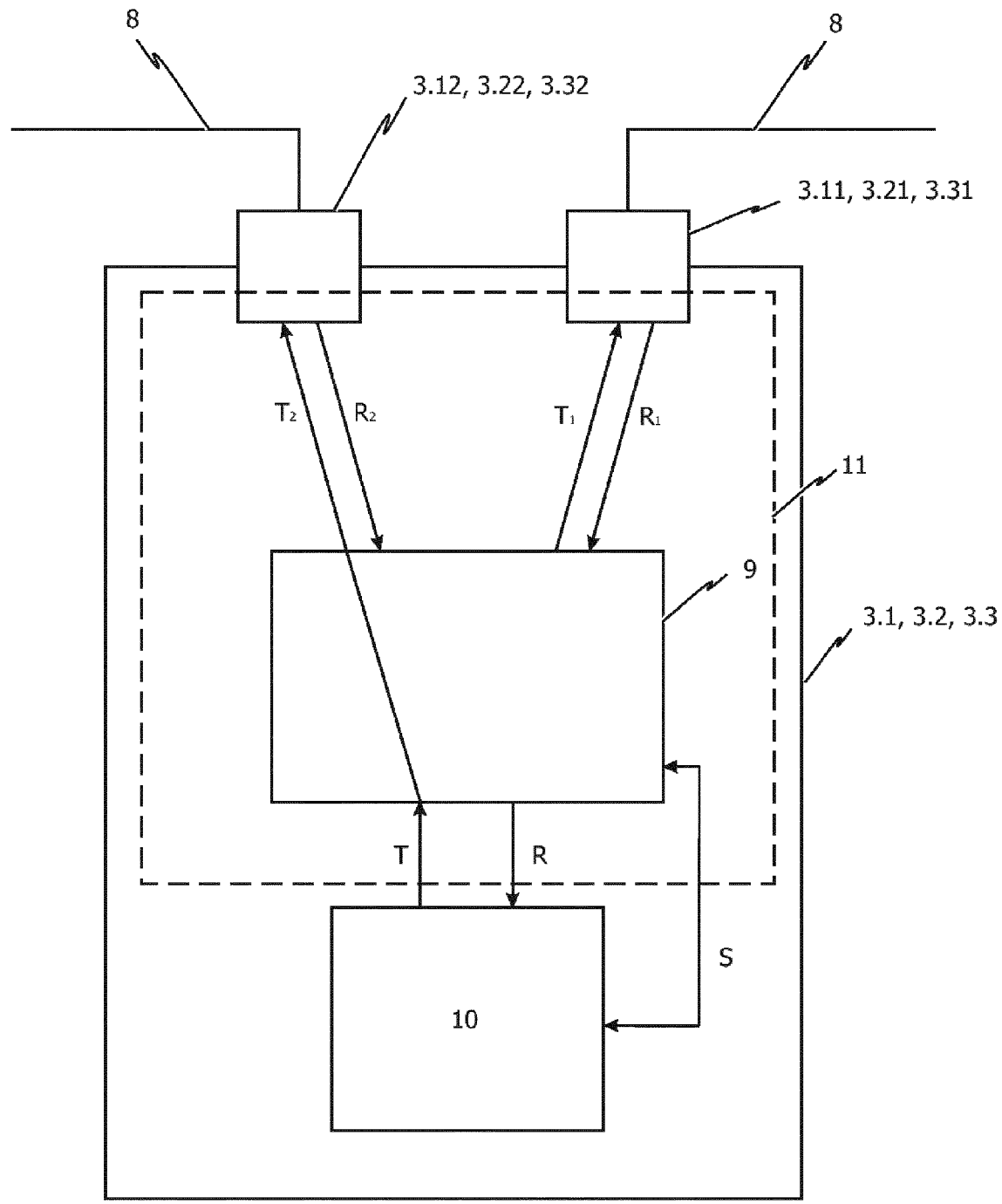
FIG. 9 a schematic block diagram of the example bus node according to FIG. 5 in a state in which the bus node transmits data over the second data communication interface of the bus coupler.
Figure 10:
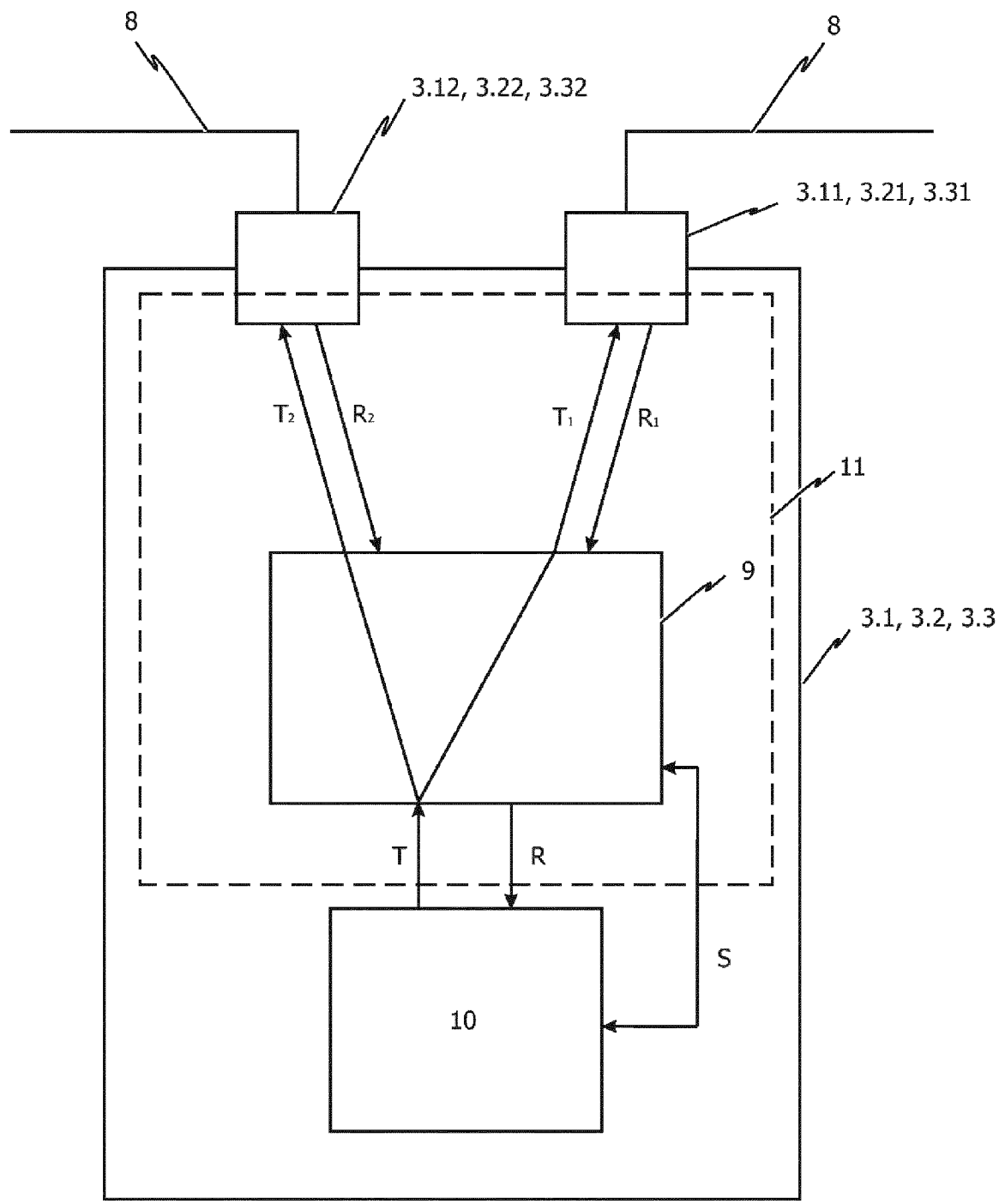
FIG. 10 a schematic block diagram of the example bus node according to FIG. 5 in a state in which the bus node transmits data over both data communication interfaces of the bus coupler.

The microcontroller 10 of the at least one bus node 3.1, 3.2, 3.3 in the embodi-ment depicted schematically in FIG. 5 is moreover designed to control the transmit/receive switching unit 9 of the bus coupler such that the transmit line T of the microcontroller 10 is connected to the transmit line T1 of the first and/or second data communication interface 3.11, 3.21, 3.31; 3.12, 3.22, 3.32 of the bus coupler (see FIGS. 8, 9 and 10).

Lastly, the transmit/receive switching unit 9 of the bus coupler depicted schemati-cally in FIG. 5 is designed to automatically detect the end of data reception at least at one of the two data communication interfaces 3.11, 3.12; 3.21, 3.22; 3.31, 3.32 of the bus coupler and disconnect the connection between the receive line R1, R2 of the respective data communication interface 3.11, 3.12; 3.21, 3.22; 3.31, 3.32 and the transmit line T1, T2 of the respective other data communication interface 3.11, 3.12; 3.21, 3.22; 3.31, 3.32 upon the end of data reception being detected.

The bus system 1 according to the invention is in one example embodiment based on the RS-485 standard and the data to be transmitted over the bus system is transmitted differentially. After for example a bus node (RS485 transceiver) receiving the data, the data is then in the form of a GND-based serial data stream.

In this example realization, the data basically consists of one start bit, eight data bits, one parity bit and one stop bit; thus a total of 11 bits. The duration of a bit depends on the baud rate. The higher the baud rate, the shorter the duration of a bit, and the lower the baud rate, the longer the bit time. A baud rate of e.g. 115200 results in a bit time of 8.68 µs. Accordingly, transmitting 11 bits takes approximately 100 µs (95.48 µs).

The logic levels described in the following all refer to the serial GND-based data stream at the RS485 transceiver output.

Preferentially, the start bit always begins with a falling edge, is thus always a low level, and the stop bit is always a high level. All else between the two cannot be predicted.

A message is usually several bytes long. A message thus always consists of multiples of 11 bits. Preferably, the bytes of a message are transmitted consecutively as a "dense" data frame. The interval of time between the bytes (within a message) should thereby not exceed a duration of 1.5 byte time. Thus, at 115200 baud, it must not take longer than 150 µs to transmit two bytes of a message in succession.

There should be a duration of at least 3.5 byte time between two different messages. Thus, at 115200 baud, there is to be a duration of at least approximately 350 µs before a new message can be transmitted to the bus.

Pursuant to the above-described embodiment, it can in general be stated that a message always begins with the falling edge of the first start bit and that a message always ends when no further byte is transmitted for at least 150 µs (at 115200 baud). Doing so as such enables the start and the end of a message to be automatically detected.

The ring bus coupler circuit thus responds to falling edges at the first and second data communication interface of the bus coupler. When a falling edge is detected at a data communication interface of the bus coupler, said data communication interface is then enabled as the receive port for data transmission and detection of falling edges is disabled for the other data communication interface of the bus coupler.

If the bus system has not yet been initialized, the ring is open such that the data from the receive port of the bus coupler 11 can only be transmitted to the data communication interface between the transmit/receive switching unit 9 and the microcontroller 10. Once initialization of the bus system has completed, the ring is closed such that the data from the receive port of the bus coupler 11 can be transmitted to both the data communication interface between the transmit/receive switching unit 9 and the microcontroller 10 as well as to the other data communication interface of the bus coupler 11 than the data communication interface serving as receive port.

Once set, the receive port preferably remains as such, and namely regardless of how many bytes are received, at what time interval, etc. It is hereby preferential for the bus coupler to assume the function of detecting the end of a message or a change in the direction of data transmission. To this end, the bus coupler 11 comprises the appropriate control logic, preferably an application-specific integrated circuit or programmable logic component (PLA, FPGA, CPLD, etc.), if applicable in combination with a microcontroller. When the bus coupler 11 detects that at least 150 µs have passed without any further byte being received, it disconnects the previously established connection. The next falling edge at the first or second data communication interface of the bus coupler can then establish a new connection.

The present invention is not limited to the example embodiments depicted in the figures but rather yields from an integrated consideration of all the features disclosed herein in context.

The invention claimed is:

1. A bus system (1) for monitoring and/or controlling components of a fire alarm and/or firefighting system, wherein the bus system (1) comprises the following:
    a control unit (2) having at least two data communication interfaces (2.1, 2.2) respectively designed to transmit and receive data; and
    at least one bus node (3.1, 3.2, 3.3) in the form of a component of a fire alarm, firefighting and/or oxygen-reducing system, wherein the bus node (3.1, 3.2, 3.3) comprises a bus coupler (11) having at least two data communication interfaces (3.11, 3.12; 3.21, 3.22; 3.31, 3.32) respectively designed to transmit and receive data, wherein the control unit (2) and the at least one bus node (3.1, 3.2, 3.3) are respectively connected together via their data communication interfaces (2.1, 2.2; 3.11, 3.12; 3.21, 3.22; 3.31, 3.32) and corresponding two-point connections (8) to form a ring topology, and wherein the bus coupler (11) of the at least one bus node (3.1, 3.2, 3.3) is designed to directly transmit, and thus forward, data received at one of its at least two communication interfaces (3.11, 3.12; 3.21, 3.22; 3.31, 3.32) via another of its at least two data communication interfaces (3.11, 3.12; 3.21, 3.22; 3.31, 3.32), wherein the control unit (2) is designed to transmit data to the at least one bus node (3.1, 3.2, 3.3) over only one of the at least two data communication interfaces (2.1, 2.2) prior to a malfunction being detected, and to change its transmission mode upon a malfunction being detected in one of the two-point connections (8) of the ring topology and then transmit the identical data to the given bus node (3.1, 3.2, 3.3) over both of its data communication interfaces (2.1, 2.2), and wherein the at least one bus node (3.1, 3.2, 3.3) is designed so as to transmit data to the control unit (2) in opposite ring topology directions via its at least two data communication interfaces (3.11, 3.12; 3.21, 3.22; 3.31, 3.32) in response to bus node-addressed data previously received from the control unit (2).

2. The bus system (1) according to claim 1, wherein the bus coupler (11) of the at least one bus node (3.1, 3.2, 3.3) comprises a transmit/receive switching unit (9) designed to detect the start of data being received at least at one of the at least two data communication interfaces (3.11, 3.12; 3.21, 3.22; 3.31, 3.32) of the bus coupler (11) and connect a receive line (R1, R2) of the respective data communication interface (3.11, 3.12; 3.21, 3.22; 3.31, 3.32) to a transmit line (T1, T2) of the other data communication interface (3.11, 3.12; 3.21, 3.22; 3.31, 3.32) upon detecting the start of data reception at one of the at least two data communication interfaces (3.11, 3.12; 3.21, 3.22; 3.31, 3.32) of the bus coupler (11).

3. The bus system (1) according to claim 2, wherein the transmit/receive switching unit (9) of the bus coupler (11) is designed to detect the end of data reception at least at the one of the at least two data communication interfaces (2.1, 2.2; 3.11, 3.12; 3.21, 3.22; 3.31, 3.32) and disconnect the receive line (R1, R2) connection of the respective data communication interface (2.1, 2.2; 3.11, 3.12; 3.21, 3.22; 3.31, 3.32) to the transmit line (T1, T2) of the respective other data communication interface (2.1, 2.2; 3.11, 3.12; 3.21, 3.22; 3.31, 3.32) upon detecting the end of data reception.

4. The bus system (1) according to claim 2, wherein the transmit/receive switching unit (9) of the bus coupler (11) comprises a logic module and/or microcontroller; and/or wherein the at least one bus node (3.1, 3.2, 3.3) comprises a processing unit (10) external of the bus coupler (11) which is formed by a logic module and/or microcontroller, and wherein the transmit/receive switching unit (9) of the bus coupler (11) is further designed to automatically connect the receive line (R1, R2) of a data communication interface (3.11, 3.12; 3.21, 3.22; 3.31, 3.32) to the receive line (R) of the processing unit (10) upon the start of data reception being detected at said one of the at least two data communication interfaces (3.11, 3.12; 3.21, 3.22; 3.31, 3.32) of the bus coupler (11).

5. The bus system (1) according to claim 4, wherein the processing unit (10) of the at least one bus node (3.1, 3.2, 3.3) is designed to control the transmit/receive switching unit (9) of the bus coupler (11) such that the transmit line (T) of the processing unit (10) connects to the transmit line (T1, T2) of a first and/or second data communication interface (3.11, 3.21, 3.31; 3.12, 3.22, 3.32) of the bus coupler (11); and/or wherein the processing unit (10) of the at least one bus node (3.1, 3.2, 3.3) is designed to control the transmit/receive switching unit (9) of the bus coupler (11) so as to inhibit the automatic connection of the receive line (R1, R2) of one of the at least two data communication interfaces (3.11, 3.12; 3.21, 3.22; 3.31, 3.32) of the bus coupler (11) to the transmit line (T1, T2) of another of the at least two data communication interfaces (3.11, 3.12; 3.21, 3.22; 3.31, 3.32) of the bus coupler (11).

6. The bus system (1) according to claim 1, wherein the at least one bus node (3.1, 3.2, 3.3) is configured as a fire alarm, a gas sensor, particularly an oxygen or nitrogen concentration sensor, as a device for detecting a fire characteristic and/or as a controllable actuator; and/or wherein the two-point connections (8) are at least partly designed as wired and/or optical data transmission channels; and/or wherein to improve the bus system (1) reliability, at least one auxiliary control unit is provided additionally to the control unit (2) which is formed so as to be redundant to said control unit (2) and take over the function of the control unit (2) upon its malfunction; and/or wherein the control unit (2) comprises failure detection to preferably automatically detect and/or localize a malfunction, particularly a break in a two-point connection (8) of the ring topology.

7. A method for operating a bus system (1) in accordance to claim 1 for monitoring and/or controlling actuatable components of a fire alarm, firefighting and/or oxygen-reducing system, wherein the method comprises the following method steps:

the control unit (2) transmits data, bus node-addressed data or commands to the at least one bus node (3.1, 3.2, 3.3) via only one of the at least two data communication interfaces (2.1, 2.2), and upon a malfunction being detected in a two-point connection (8) of the ring topology, transmits the identical data to the given bus node (3.1, 3.2, 3.3) via both of its data communication interfaces (2.1, 2.2); and the at least one bus node (3.1, 3.2, 3.3) transmits data to the control unit (2) in response to the bus node-addressed data or commands previously received from the control unit (2) via its at least two data communication interfaces (3.11, 3.12; 3.21, 3.22; 3.31, 3.32) and in opposite ring topology directions.

8. The method according to claim 7, wherein the method further comprises the following method step:

initializing of the bus system (1) by the at least one bus node (3.1, 3.2, 3.3) being preferably automatically assigned an address by the control unit (2).

9. The method according to claim 8, wherein a plurality of bus nodes (3.1, 3.2, 3.3) are provided, and wherein the control unit (2) transmits sequential configuration data to the individual bus nodes (3.1, 3.2, 3.3) during the method step of initializing the bus system (1) for the purpose of assigning bus node-specific addresses to said individual bus nodes (3.1, 3.2, 3.3), wherein subsequent a bus node (3.1, 3.2, 3.3) being assigned an address, data from the control unit (2) transmitted over the bus system (1) which is not addressed to one bus node (3.1, 3.2, 3.3) is forwarded to the next bus node (3.1, 3.2, 3.3) without delay and while maintaining the transmission direction.

10. The method according to claim 7, wherein the control unit (2) preferably automatically detects a malfunction, particularly a break, in a two-point connection (8) of the ring topology when only one of the at least two data communication interfaces (2.1, 2.2) of the control unit (2) receives data sent through the bus system (1) to the control unit (2) from the at least one bus node (3.1, 3.2, 3.3);

wherein the control unit (2) preferably automatically detects a malfunction, particularly a break, in a two-point connection (8) of the ring topology when the control unit (2) transmits data along with an acknowledge/response request to the at least one bus node (3.1, 3.2, 3.3) over only one of the at least two data communication interfaces (2.1, 2.2) and the control unit (2) receives no data from the at least one bus node (3.1, 3.2, 3.3) via at least one of its at least two data communication interfaces (2.1, 2.2) despite the acknowledge/response request.

11. The method according to claim 10, wherein the control unit (2) transmits all data to the at least one bus node (3.1, 3.2, 3.3) via its at least two data communication interfaces (2.1, 2.2), and in opposite transmission directions, at least after a malfunction being detected in a two-point connection (8) of the ring topology, so as to ensure that despite there being a malfunction in a two-point connection (8) of the ring topology, the at least one bus node (3.1, 3.2, 3.3) generally receives all the data transmitted from the control unit (2) to said at least one bus node (3.1, 3.2, 3.3) and the control unit (2) generally receives all the data transmitted from the at least one bus node (3.1, 3.2, 3.3) to said control unit (2).

12. The method according claim 7, wherein the control unit (2) transmits all data to the at least one bus node (3.1, 3.2, 3.3) via only one of its at least two data communication interfaces (2.1, 2.2) prior to a malfunction being detected in a two-point connection (8) of the ring topology, and wherein the control unit (2) transmits all data to the at least one bus node (3.1, 3.2, 3.3) via its at least two data communication interfaces (2.1, 2.2), and in opposite transmission directions, after a malfunction being detected in a two-point connection (8) of the ring topology.

13. The method according to claim 12, wherein after a malfunction being detected in a two-point connection (8) of the ring topology, the control unit (2) preferably automatically localizes the two-point connection (8) of the ring topology with the malfunction, wherein the control unit (2) hereto transmits data along with an acknowledge/response request to all the bus nodes (3.1, 3.2, 3.3) and evaluates via which of its at least two data communication interfaces (2.1, 2.2) and from which bus node (3.1, 3.2, 3.3) acknowledge/response data is received.

14. The method according to claim 7, wherein the control unit (2) preferably automatically detects a malfunction, particularly a failure of the at least one bus node (3.1, 3.2, 3.3), when the control unit (2) does not receive any respective acknowledge/response data from the bus node (3.1, 3.2, 3.3) via any of its at least two data communication interfaces (2.1, 2.2) despite the acknowledge/response request.

* * * * *